(12) United States Patent
Plouraboue et al.

(10) Patent No.: US 7,302,791 B2
(45) Date of Patent: Dec. 4, 2007

(54) LAWN MOWER

(75) Inventors: Tommy Plouraboue, Ormes-Loire (FR); Dominique Vougier, Ormes-Loire (FR); Cyril Perotin, Ormes-Loire (FR); Patrick Templier, Ormes-Loire (FR); Atsushi Kojima, Ormes-Loire (FR)

(73) Assignee: Honda Motor Co., Ltd. (JP)

( * ) Notice: Subject to any disclaimer, the term of this patent is extended or adjusted under 35 U.S.C. 154(b) by 0 days.

(21) Appl. No.: 11/216,393

(22) Filed: Aug. 31, 2005

(65) Prior Publication Data

US 2006/0042215 A1    Mar. 2, 2006

(30) Foreign Application Priority Data

Sep. 2, 2004    (JP) ............... 2004-255862

(51) Int. Cl.
*A01D 43/00* (2006.01)
*A01D 43/06* (2006.01)

(52) U.S. Cl. ..................................... 56/202

(58) Field of Classification Search ............... 56/202, 56/320.2, 16.6
See application file for complete search history.

(56) References Cited

U.S. PATENT DOCUMENTS

| | | | | |
|---|---|---|---|---|
| 2,774,402 A | * | 12/1956 | Wikle | 383/102 |
| 3,517,493 A | * | 6/1970 | Kiteley | 56/194 |
| 3,757,503 A | | 9/1973 | Soldavini | 56/202 |
| 4,399,647 A | * | 8/1983 | Soldavini | 56/202 |
| 4,512,144 A | * | 4/1985 | Soldavini | 56/202 |
| 4,631,909 A | * | 12/1986 | McLane | 56/202 |
| 4,843,805 A | * | 7/1989 | Satoh | 56/202 |
| 5,042,241 A | * | 8/1991 | Boylston et al. | 56/202 |
| 5,517,811 A | * | 5/1996 | Schaedler et al. | 56/320.2 |
| 5,564,265 A | * | 10/1996 | Pitt | 56/202 |
| 5,960,613 A | * | 10/1999 | Mixon et al. | 56/10.2 R |
| 6,272,818 B1 | * | 8/2001 | Sebben et al. | 56/10.2 R |

FOREIGN PATENT DOCUMENTS

| | | |
|---|---|---|
| DE | 8608189 | 5/1986 |
| EP | 0738462 | 10/1996 |
| FR | 2712138 | 5/1995 |
| JP | 2123826 | 10/1990 |

* cited by examiner

*Primary Examiner*—Árpád Fábián Kovács
(74) *Attorney, Agent, or Firm*—Adams & Wilks

(57) ABSTRACT

A lawn mower includes a grass bag for collecting cut grass, which is attached to a rear wall of a cutter housing of the lawn mower. The rear wall includes an exit that communicates the grass bag with a cut grass carrying passage formed in the cutter housing, and a plurality of internal pressure control holes formed proximately to the exit. When a grass cutting operation continues, cut grass is accumulated in the grass bag, causing the internal pressure of the bag to rise. By virtue of the control holes, rise of the internal pressure is restrained.

16 Claims, 13 Drawing Sheets

LAWN MOWER

FIELD OF THE INVENTION

The present invention relates to a lawn mower in which the internal pressure of a grass bag is reduced.

BACKGROUND OF THE INVENTION

A lawn mower in which a cut grass collecting unit (grass bag) for collecting grass cut by a cutter blade is removably attached to the rear part of a cutter housing is proposed for example in JP-UM-A-2-123826. This lawn mower will be described on the basis of FIG. 15.

A lawn mower 230 shown in FIG. 15 has an engine 232 mounted on the top of a cutter housing 231. A cutter blade (not shown) is attached to the output shaft of the engine 232 and rotates inside the cutter housing 231. A grass bag 234 is attached to a rear part of the cutter housing 231.

Grass is cut with the cutter blade. Cut grass is carried through a cut grass carrying passage 235 of the cutter housing 231 into the grass bag 234 by a carrying draft, and is collected in the grass bag 234.

However, there has been the problem that, when cut grass is collected in the grass bag 234 through the cut grass carrying passage 235, as the grass cuttings accumulate in the grass bag 234, the internal pressure of the grass bag 234 increases and obstructs the flow of the carrying draft.

Because of this, it has not been possible to pack enough cut grass into the grass bag 234, and when the volume of the grass bag 234 is increased to increase the volume of grass cuttings that it can hold, there has been the shortcoming that the lawn mower including the grass bag 234 becomes large.

Accordingly, a lawn mower has been awaited with which it is possible to collect as much cut grass as possible in a grass bag of a fixed size.

SUMMARY OF THE INVENTION

The invention provides a lawn mower including: a cutter housing having a scroll part and having at its rear a cut grass carrying passage for carrying cut grass from the scroll part; and a grass bag removably attached to a rear wall formed in the cutter housing and having an exit of the cut grass carrying passage formed in it, wherein the rear wall has a multiple internal pressure control holes formed beside the exit of the cut grass carrying passage to reduce the internal pressure of the grass bag.

Because in this invention multiple internal pressure control holes for reducing the internal pressure of the grass bag are formed in the rear wall beside the exit of the cut grass carrying passage like this, even when a large quantity of cut grass accumulates in the grass bag the internal pressure of the grass bag does not rise and the flow of a carrying draft into the grass bag can be ensured. As a result, it is possible to collect a large quantity of grass cuttings in a grass bag of a fixed size.

Preferably, each of the multiple internal pressure control holes is a long hole oriented in the up-down direction of the rear wall. In this case, for example compared to a case where the internal pressure control holes are each formed in a square shape of side length equal to the long sides of the long holes, or a case where the internal pressure control holes are formed in a round shape of diameter equal to the long sides of the long holes, the probability of grass cuttings of the same length as the long sides of the long holes passing through the holes can be made lower. As a result, only air passes through the internal pressure control holes, and the internal pressure of the grass bag can be reduced.

Desirably, each of the multiple internal pressure control holes has at its upper end a deflecting part for deflecting the flow of air through it. In this case, cut grass having passed through the internal pressure control holes falls to the lawn surface (ground surface), and the accumulation of cut grass on peripheral parts of the cutter housing is suppressed.

BRIEF DESCRIPTION OF THE DRAWINGS

Certain preferred embodiments of the invention will be described in detail below, by way of example only, with reference to the accompanying drawings, in which.

DETAILED DESCRIPTION OF THE PREFERRED EMBODIMENTS

Figure 1:
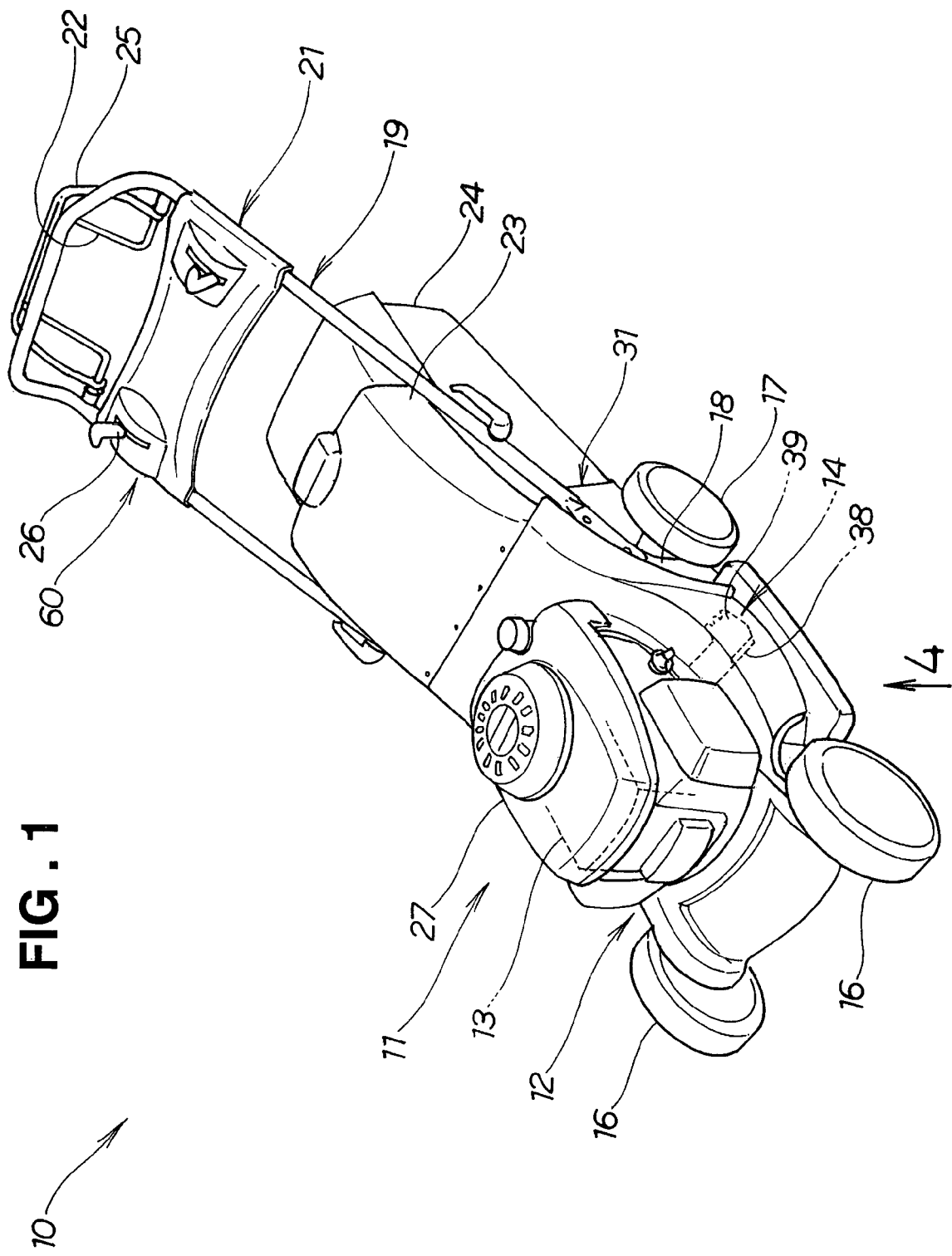
FIG. 1 is a perspective view of a lawn mower according to the invention.

A lawn mower 10 constituting a preferred embodiment of the invention shown in FIG. 1 is of a self-propelling type. A cutter blade 14 for cutting grass is rotated by an engine 13, which is a motive power source. Cut grass is collected by being carried from a cutter housing 12 by a carrying draft into a grass bag 24. Rear wheels 17 are driven by the engine 13.

In the figure, the reference number 11 denotes a machine body; 16 front wheels; 18 handle stays; 19 a handle; 21 a handle cover extending across the handle 19; 22 a clutch lever for travel, which clutch-controls motive power transmission from the engine 13 to the rear wheels 17; 23 a grass cover; 25 a clutch lever for clutch-controlling rotational power to the cutter blade 14; 26 a lock lever; 27 a head cover; and 60 a lock mechanism.

The clutch lever 25 is a lever that simultaneously performs an operation of applying a brake to the cutter blade 14 while stopping the driving of the cutter blade 14, and is sometimes called a BBC control lever because it controls a blade, a brake and a clutch.

Figure 2:
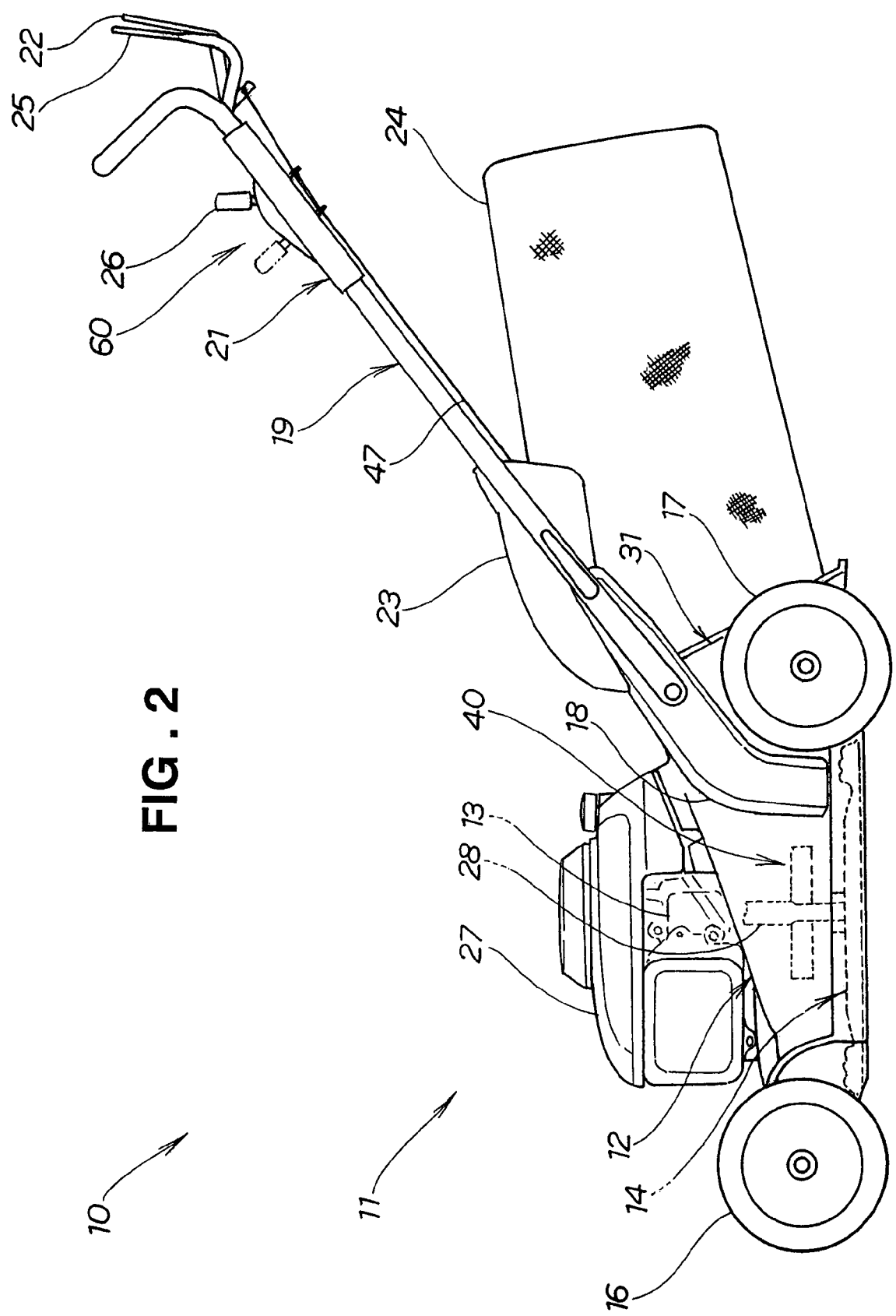
FIG. 2 is a side view of the lawn mower shown in FIG. 1.

As shown in FIG. 2, the engine 13 of the lawn mower 10 is mounted on the top of the cutter housing 12. The cutter blade 14 is attached to the output shaft 28 of the engine 13 by way of a clutch mechanism 40. The left and right front wheels 16 are disposed at side faces of the front part of the cutter housing 12, and the left and right rear wheels 17 are disposed at side faces of the rear part of the cutter housing 12. Left and right handle stays 18 are attached to the side faces of the rear part of the cutter housing 12. The handle 19 extends rearward from the rear parts of these handle stays 18, 18. The clutch lever 25 is mounted on this handle 19 and controls the clutch mechanism 40. The lock lever 26 is mounted in front of the clutch lever 25 and bars an engaging function of the clutch lever. The grass bag 24 is removably attached to a rear wall 31 of the cutter housing 12. A grass guard 23 is swingably attached to an upper part of the rear wall 31 of the cutter housing 12.

The grass bag 24 is made of a porous material having air holes (not shown) through which the carrying draft can pass but grass cuttings cannot pass.

Figure 3:
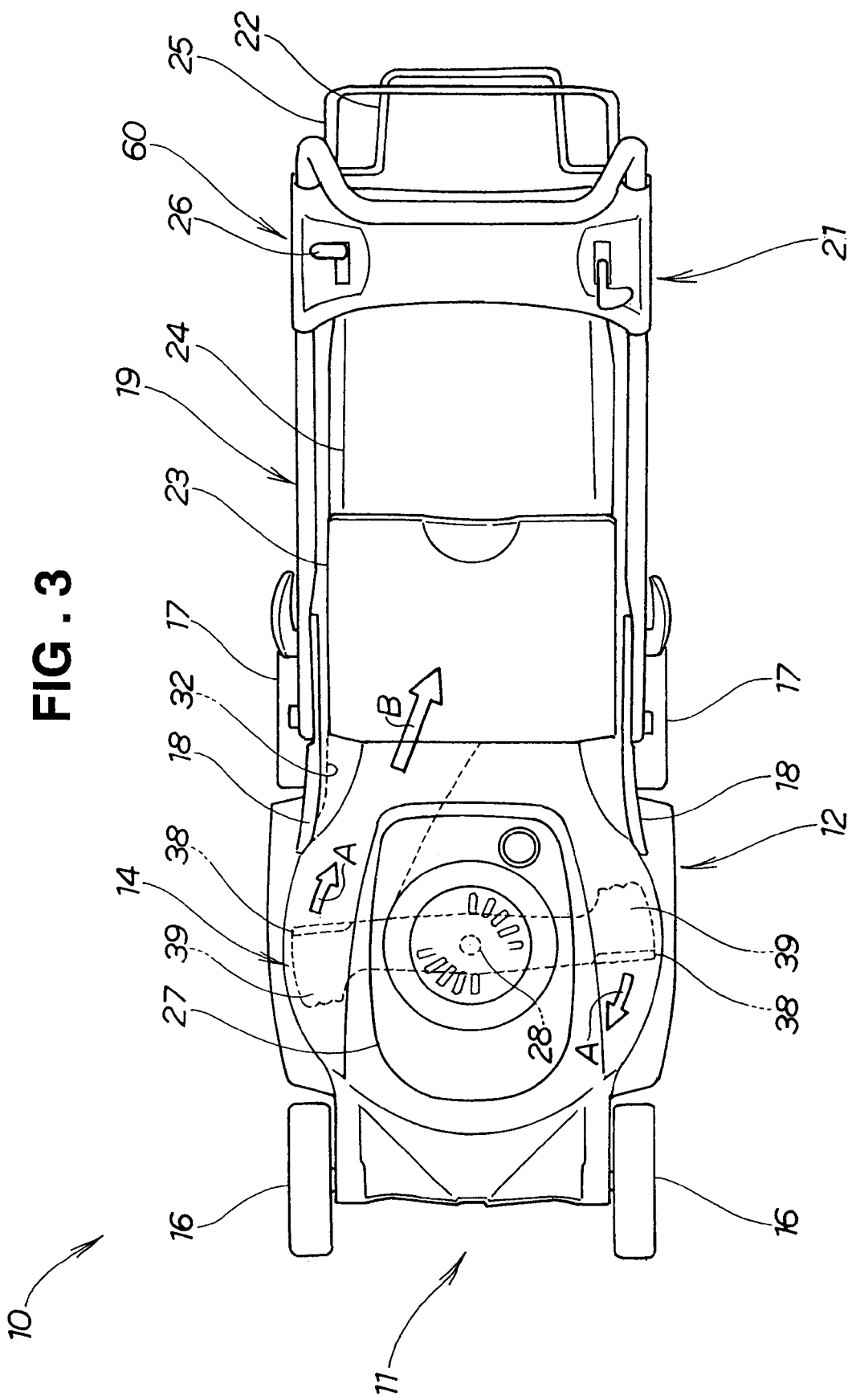
FIG. 3 is a plan view of the lawn mower shown in FIG. 1.

As shown in FIG. 3, in the lawn mower 10, with the engine 13 (see FIG. 2) started, the clutch mechanism 40 (see FIG. 2) is switched from an off state to an engaged state by a two-stage motion of shifting the clutch lever 25 to the handle 19 side and then shifting the lock lever 26 forward, to rotate the cutter blade 14, and the clutch lever for travel 22 is shifted to the handle 19 side to rotate the rear wheels 17, 17.

The cutter blade 14 has blade parts 38, 38 on its leading sides in the rotation direction shown with the arrows A, A, and from these blade parts 38, 38 on its trailing sides in the rotation direction it has air-lifting parts 39, 39 formed so as to curve upward.

That is, as the cutter blade 14 rotates, grass on the ground surface is caused to stand up by a negative pressure arising on the undersides of the air-lifting parts 39, 39, and the grass is cut by the blade parts 38, 38. The cut grass is hit by the upper sides of the air-lifting parts 39, 39 and caught by a swirling airflow created by the rotation of the cutter blade 14, and with this swirling airflow as a carrying draft the grass cuttings are fed together with the carrying draft through a cut grass carrying passage 32 into the grass bag 24 as shown by the arrow B.

Figure 4:
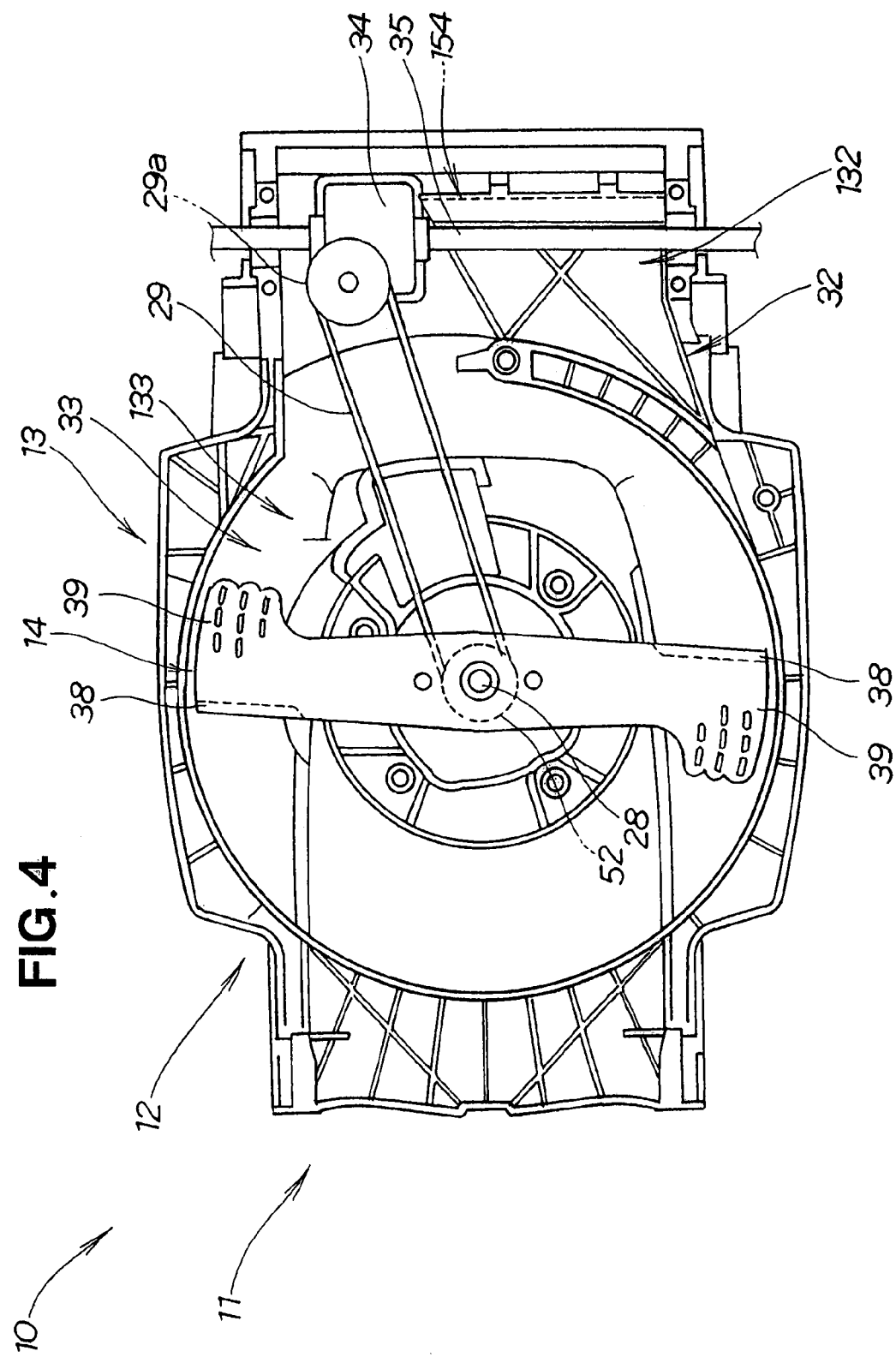
FIG. 4 is a view in the direction of the arrow 4 in FIG. 1.

FIG. 4 shows the underside of the lawn mower 10.

The cutter blade 14 is covered by the cutter housing 12. The cut grass carrying passage 32 for guiding cut grass into the grass bag 24 (see FIG. 2) is formed in the cutter housing 12. This cut grass carrying passage 32 connects with the grass bag 24.

The reference number 29 denotes a power-transmitting part (a belt); 33 a scroll part provided in the cutter housing 12 for rotatably receiving the cutter blade 14; 52 a drive pulley; 34 a clutch for travel; and 35 a rear wheel axle.

In the lawn mower 10, the output of the engine 13 is transmitted from the drive pulley 52 of the output shaft 28 to a driven pulley 29a by the belt 29, and by way of the driven pulley 29a and the clutch for travel 34 the output of the engine 13 is transmitted to the rear wheel axle 35 and drives the rear wheels 17, 17 (see FIG. 3).

Figure 5:
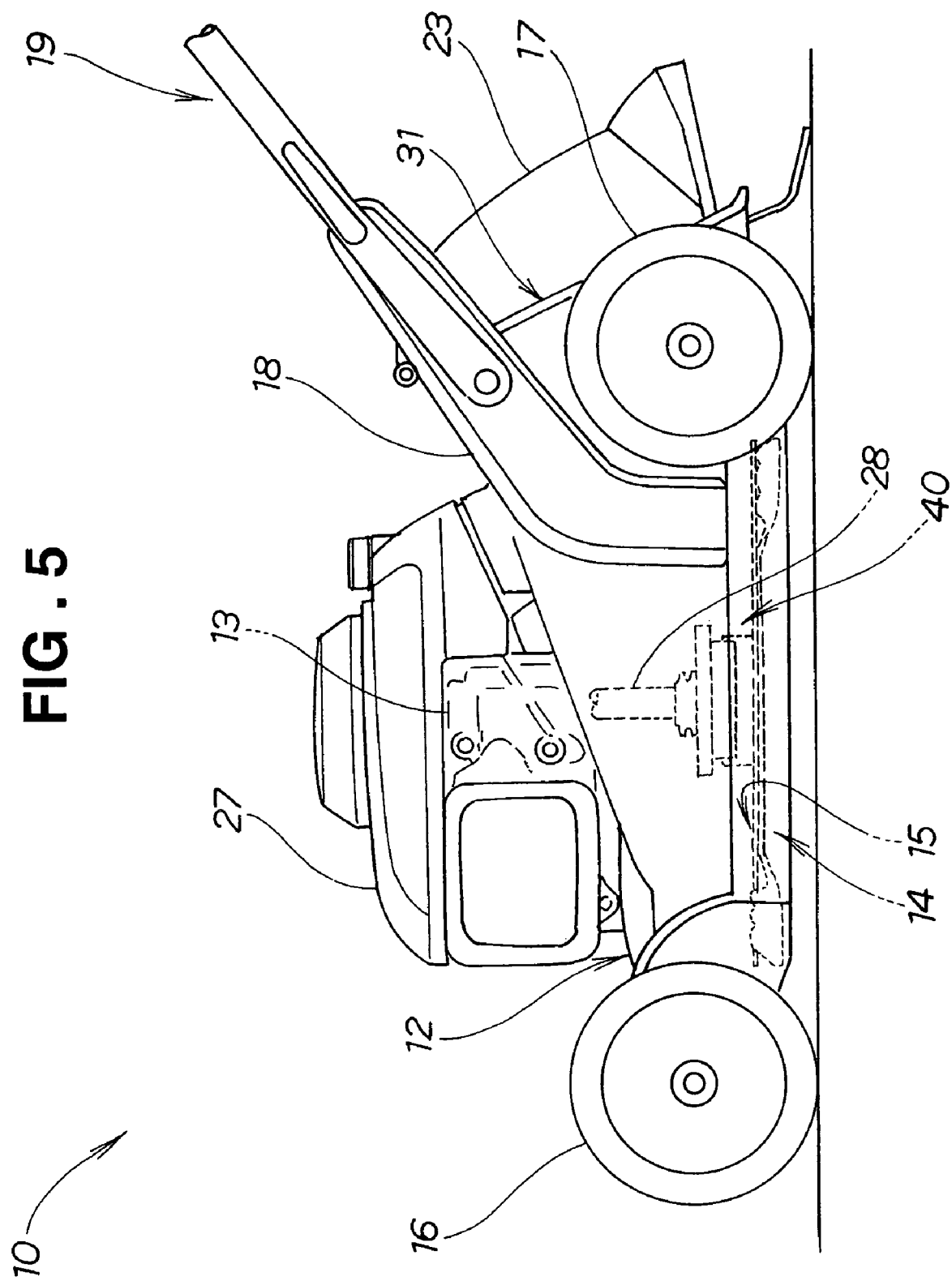
FIG. 5 is a side view of the lawn mower shown in FIG. 1 in a mulching work state.

FIG. 5 shows a mulching work state of the lawn mower. Mulching work (mulching mode) is a working mode in which two cutter blades are provided in the cutter housing, grass is cut with these cutter blades, and finely cut grass cuttings are dispersed on the lawn surface (ground surface) so that they are inconspicuous. Mulching work is an alternative mode of discharge work, discussed below.

Discharge work (discharge mode) is a working mode in which grass is cut with one cutter blade, and the cut grass is made to pass through the cut grass carrying passage and discharged to outside through the grass cover.

Bagging work (bagging mode) is a working mode in which grass is cut with one cutter blade and the cut grass is made to pass through the cut grass carrying passage and collected in the grass bag.

That is, the lawn mower 10 of this preferred embodiment is capable of mulching work, discharge work and bagging work (see FIG. 2). When mulching work is to be done, an upper cutter blade 15 for mulching work is fitted to the output shaft 28 of the engine 13 along with a cutter blade 14 for discharge work and bagging work, and a closing member (not shown) is placed in the cut grass carrying passage 32 (see FIG. 4).

Figure 6:
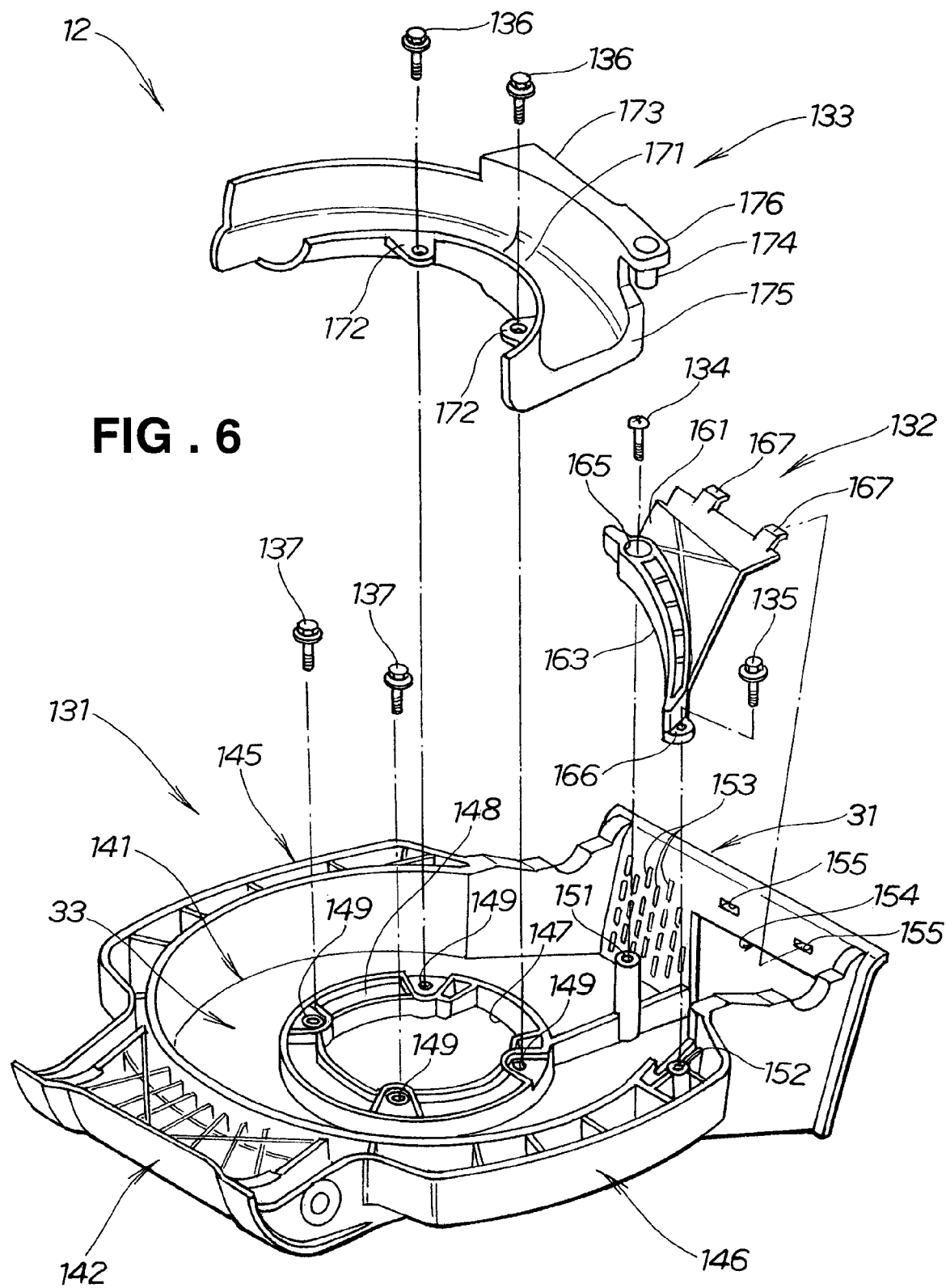
FIG. 6 is an exploded perspective view of a cutter housing according to the invention.
Figure 7:
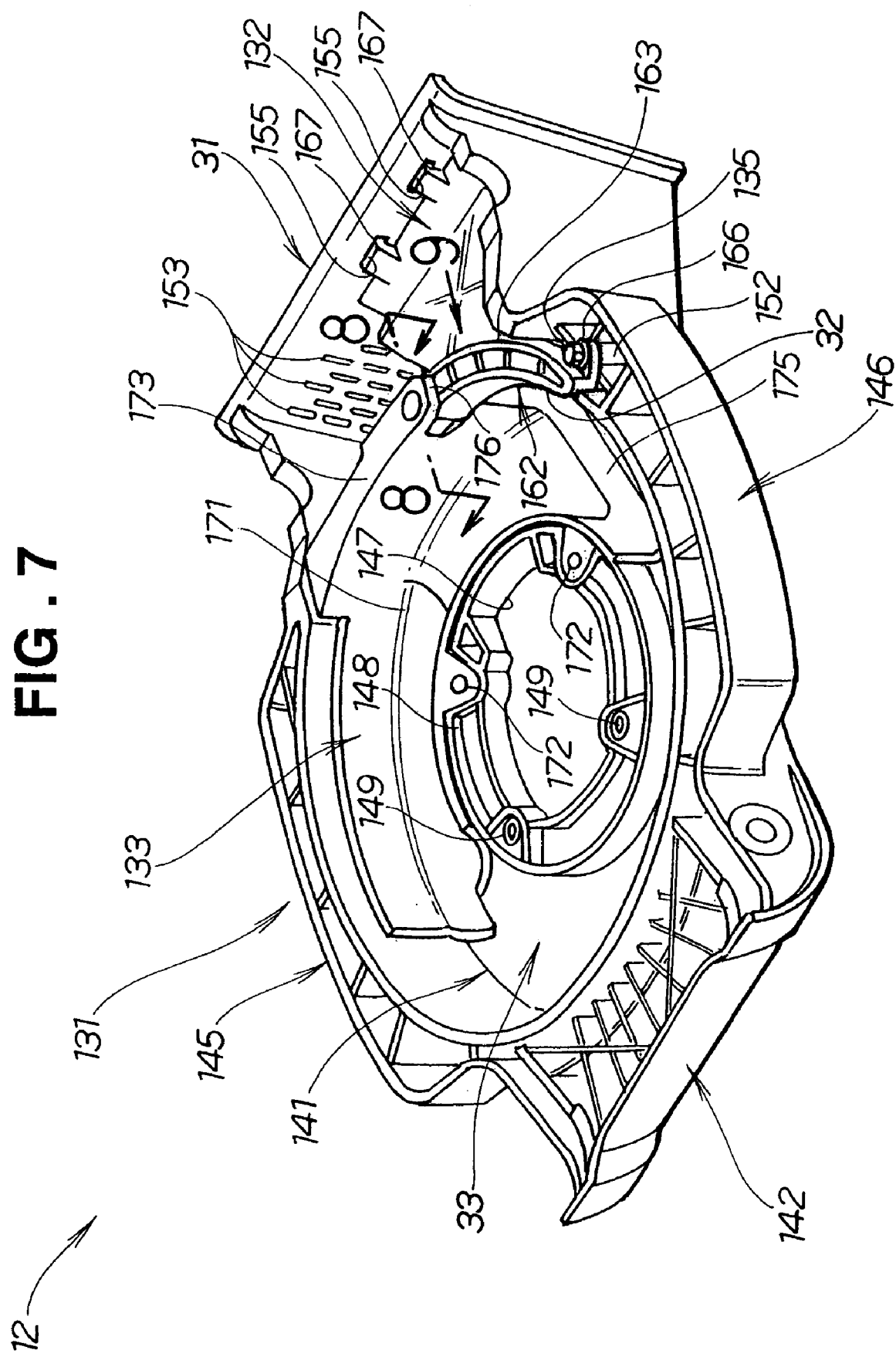
FIG. 7 is a perspective view of the cutter housing shown in FIG. 6 in an assembled state.

FIG. 6 and FIG. 7 show a cutter housing 12 according to the invention in an upside-down state.

The cutter housing 12 is made up of a housing proper or housing main body 131 for receiving the cutter blade 14; a bottom member 132, attached to this housing proper 131, for forming the cut grass carrying passage 32 (see FIG. 4); and a scroll guide member 133, attached to the housing proper 131, for forming the scroll part 33 (see FIG. 4). This cutter housing 12 is made of a resin material.

The bottom member 132 is attached to the housing proper 131 by fixing screws 134, 135. The scroll guide member 133 is co-fastened to the cutter housing 12 and the engine 13 (see FIG. 1) with fixing screws 136, 136.

The reference numbers 137, 137 denote fixing screws for fixing the engine 13 to the cutter housing 12.

The housing proper or housing main body 131 has a top wall and an arcuate inner sidewall that jointly define a housing concavity 141 (FIG. 6) forming the cut grass carrying passage 32 and the scroll part 33 shown in FIG. 4. A front guard part 142 is formed at the front of this housing concavity 141. A rear wall 31 is formed at the rear of the housing concavity 141. Left and right side guard parts 145, 146 are formed at the left and right sides of the housing concavity 141.

The output shaft 28 of the engine 13 and the clutch mechanism 40 shown in FIG. 2 are passed through a top opening 147 formed in the center of the housing concavity 141.

An engine mount part 148 for the engine 13 to be mounted to is formed around the top opening 147. The engine 13 is mounted to the engine mount part 148 using the fixing screws 136, 137 and a plurality of fixing holes 149 formed in the engine mount part 148.

An inner mounting boss 151 for mounting the bottom member 132 to the housing proper 131 is formed in the housing concavity 141. Also, an outer mounting boss 152 for mounting the bottom member 132 to the housing proper 131 is formed on the right side guard part 146.

Multiple internal pressure control holes 153 for controlling the internal pressure of the grass bag 24 (see FIG. 2) are formed in the left lateral side of the rear wall 31. A cut grass carrying passage exit 154 (exit-side opening) is formed in the right lateral side of the rear wall 31. The open end of the grass bag 24 covers the internal pressure control holes 153 and the cut grass carrying passage exit 154 which are formed in the rear wall 31. Engaging holes 155, 155 for engaging with the bottom member 132 are also formed in the right side of the rear wall 31.

The bottom member 132 has a body part 161 for forming the bottom of the cut grass carrying passage 32 (see FIG. 4); an entrance-side reinforced part 163 formed at the front of the body part 161 so that it forms a flange in the shape of an arc of the circle of the scroll part 33 (see FIG. 4) and completes a cut grass carrying passage entrance 162 (see FIG. 7); an inner mounting part 165, formed at the inner end of this entrance-side reinforced part 163, to be fixed to the inner mounting boss 151; an outer mounting part 166, formed at the outer end of the entrance-side reinforced part 163, to be fixed to the outer mounting boss 152; and projections 167, 167, formed at the rear of the body part 161, to fit in the engaging holes 155, 155 formed in the rear wall 31.

The entrance-side reinforced part 163 has the function of completing the vertical wall of the scroll part 33.

The scroll guide member 133 has an arcuate scroll channel 171 through which an approximate sectional U-shape forming the scroll part 33 (see FIG. 4) continues. The scroll guide member 133 is co-fastened to the housing proper 131 along with the engine 13 through co-fastening parts 172, 172 formed at the inner periphery of this scroll channel 171. A flange part 173 formed on the outer periphery of the scroll channel 171 forms an arcuate flange of the scroll part 33. The flange part 173 has a boss part 174 formed at one end 176 of it. The boss part 174 is fitted (press-fitted) in the inner mounting part 165 of the bottom member 132. A carrying passage side face part 175 forming a part of a side face of the cut grass carrying passage 32 is formed at the end 176 of the scroll channel 171.

The reference number 177 denotes the other end of the flange part 173.

Also, to obtain the ideal (desired) shape of the scroll guide member 133, the scroll guide member 133 is positioned at the lowest position of the cut grass carrying passage entrance 162 of the cut grass carrying passage 32 and is formed in a shape continuous with the housing proper 131 at the vicinity of the maximum width of the cutter housing 12.

Because the cutter housing 12 is divided into the housing proper 131, the cut grass carrying passage 32 and the scroll guide member 133 like this, simplification of dies for molding the members constituting the cutter housing 12 is achieved and the manufacturability of the cutter housing 12 can be improved.

Because the projections 167, 167 formed on the bottom member 132 are engaged with the engaging holes 155, 155 formed in the rear wall 31 of the housing proper 131, the ease of assembly of the bottom member 132 to the housing proper 131 is improved.

And because the scroll guide member 133 is co-fastened to the engine 13 and the housing proper 131, notwithstanding the increase in the number of parts arising from the division of the cutter housing 12 into a plurality of members, as mentioned above, there is no increase in the number of fixing screws.

Figure 8:
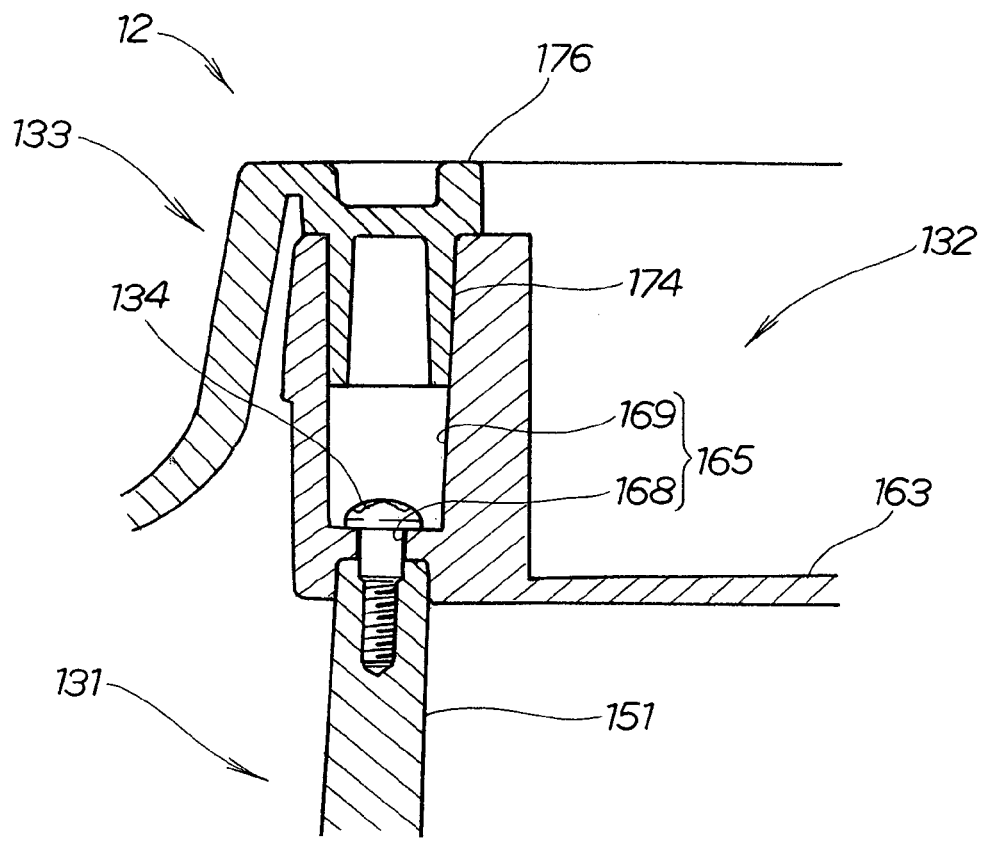
FIG. 8 is a sectional view on the line 8-8 in FIG. 7.

As shown in FIG. 8, the inner mounting part 165 of the bottom member 132 has a through hole 168 for a fixing screw 134 to pass through and a mating tubular part 169 for the boss part 174 of the scroll guide member 133 to mate with.

As a result of the entrance-side reinforced part 163 of the bottom member 132 being fixed to the housing proper 131 and the boss part 174 of the scroll guide member 133 being mated with the boss part 174, the ease of assembly of the bottom member 132 and the scroll guide member 133 improves.

Figure 9:
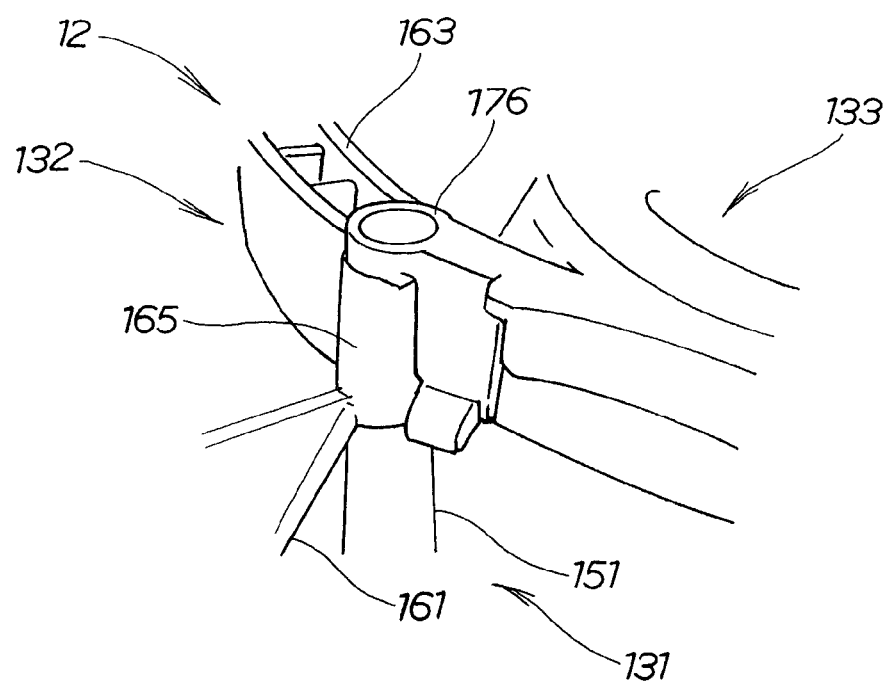
FIG. 9 is a view in the direction of the arrow 9 in FIG. 7.

As shown in FIG. 9, by the inner mounting part 165 of the bottom member 132 being fixed to the inner mounting boss 151 of the housing proper 131 and the boss part 174 of the scroll guide member 133 being fitted (press-fitted) into the mating tubular part 169 (see FIG. 8) of this inner mounting part 165, the two members that are the bottom member 132 and the scroll guide member 133 can be supported on the one inner mounting boss 151. Also, the entrance-side reinforced part 163 of the bottom member 132 and the scroll guide member 133 are assembled in a continuous circular arc shape so as to allow rotation of the cutter blade 14 (see FIG. 4).

Figure 10:
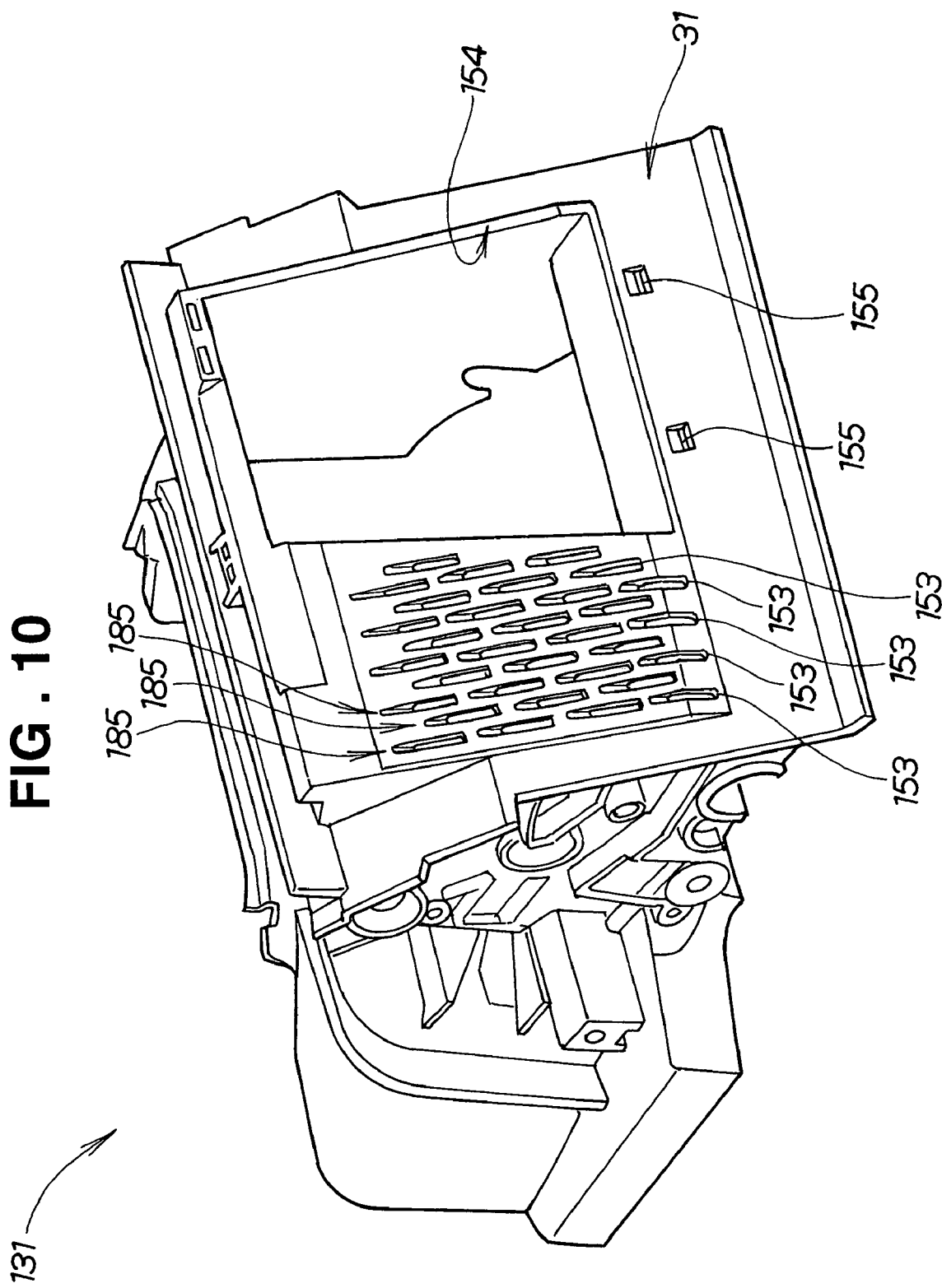
FIG. 10 is a perspective view showing a rear wall of a housing proper shown in FIG. 6.

FIG. 10 shows the housing proper 131 of the cutter housing according to the invention as seen from a diagonally backward direction.

The rear wall 31 of the housing proper 131 has the multiple internal pressure control holes 153 for keeping down the internal pressure of the grass bag 24 (see FIG. 2), the cut grass carrying passage exit (the exit) 154, and the engaging holes 155, 155 for the bottom member 132 shown in FIG. 6 to engage with.

For example, because as cut grass accumulates in the grass bag 24 shown in FIG. 2 the empty space in the grass bag 24 becomes small and it becomes difficult for the carrying draft to flow into it, the cut grass collecting capacity falls.

With respect to this, the multiple internal pressure control holes 153 reduce the internal pressure of the grass bag 24 and ensure the flow of the carrying draft into the grass bag 24. The internal pressure control holes 153 will now be described in detail on the basis of FIG. 11 to FIG. 13.

Figure 11:
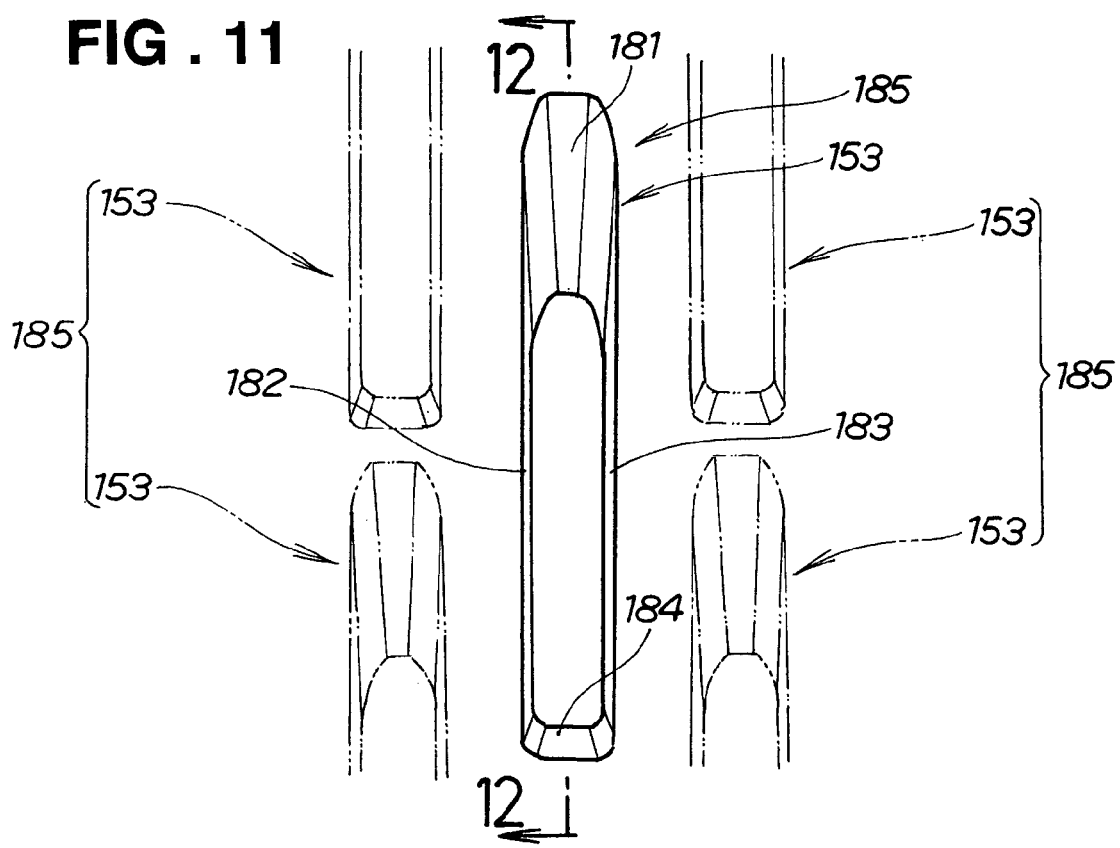
FIG. 11 is a front view of internal pressure control holes shown in FIG. 10.

As shown in FIG. 11, each of the internal pressure control holes 153 is a vertical hole (a hole long in the up-down direction of the rear wall 31), and is a hole formed tapering toward the inside of the cutter housing 12 (see FIG. 7). Each internal pressure control hole 153 has an upper taper part 181 serving as a deflecting plate formed at its upper end, left and right taper parts 182, 183 formed at its sides, and a lower taper part 184 formed at its lower end.

By the internal pressure control holes 153 being made long holes oriented in the up-down direction of the rear wall 31 like this, for example compared to a case where the internal pressure control holes 153 are each formed in a square shape of side length equal to the long sides of the long holes, or a case where the internal pressure control holes 153 are formed in a round shape of diameter equal to the long sides of the long holes, the probability of grass cuttings of the same length as the long sides of the long holes passing through the holes can be made lower. As a result, only air passes through the internal pressure control holes 153, and the internal pressure of the grass bag 24 (see FIG. 2) can be reduced.

As a result of the internal pressure control holes 153 each having the upper taper part 181, the left and right taper parts 182, 183 and the lower taper part 184, as well as it being possible to make easy the manufacture of a mold for forming the cutter housing 12 (see FIG. 7), the draft taper of pins of the mold can be made large and the life of the mold can be extended.

The multiple internal pressure control holes 153 are arranged in a so-called zig-zag pattern such that, when columns of multiple internal pressure control holes 153 disposed in vertical lines in the rear wall 31 are called internal pressure control hole columns 185, the internal pressure control holes 153 of adjacent internal pressure control hole columns 185, 185 are staggered vertically with respect to each other.

By the internal pressure control holes 153 being disposed in a zig-zag pattern like this, the internal pressure control holes 153 can be formed uniformly in the rear wall 31 and the opening density of the internal pressure control holes 153 can be increased. Also, the rear wall 31 can be made more rigid and the rigidity of the cutter housing 12 (see FIG. 7) as a whole can be increased.

Figure 12:
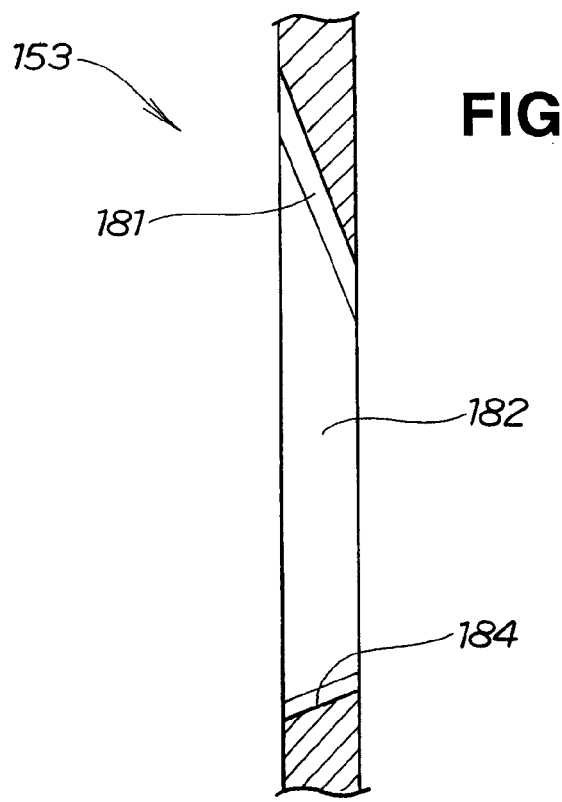
FIG. 12 is a sectional view on the line 12-12 in FIG. 11.
Figure 13:
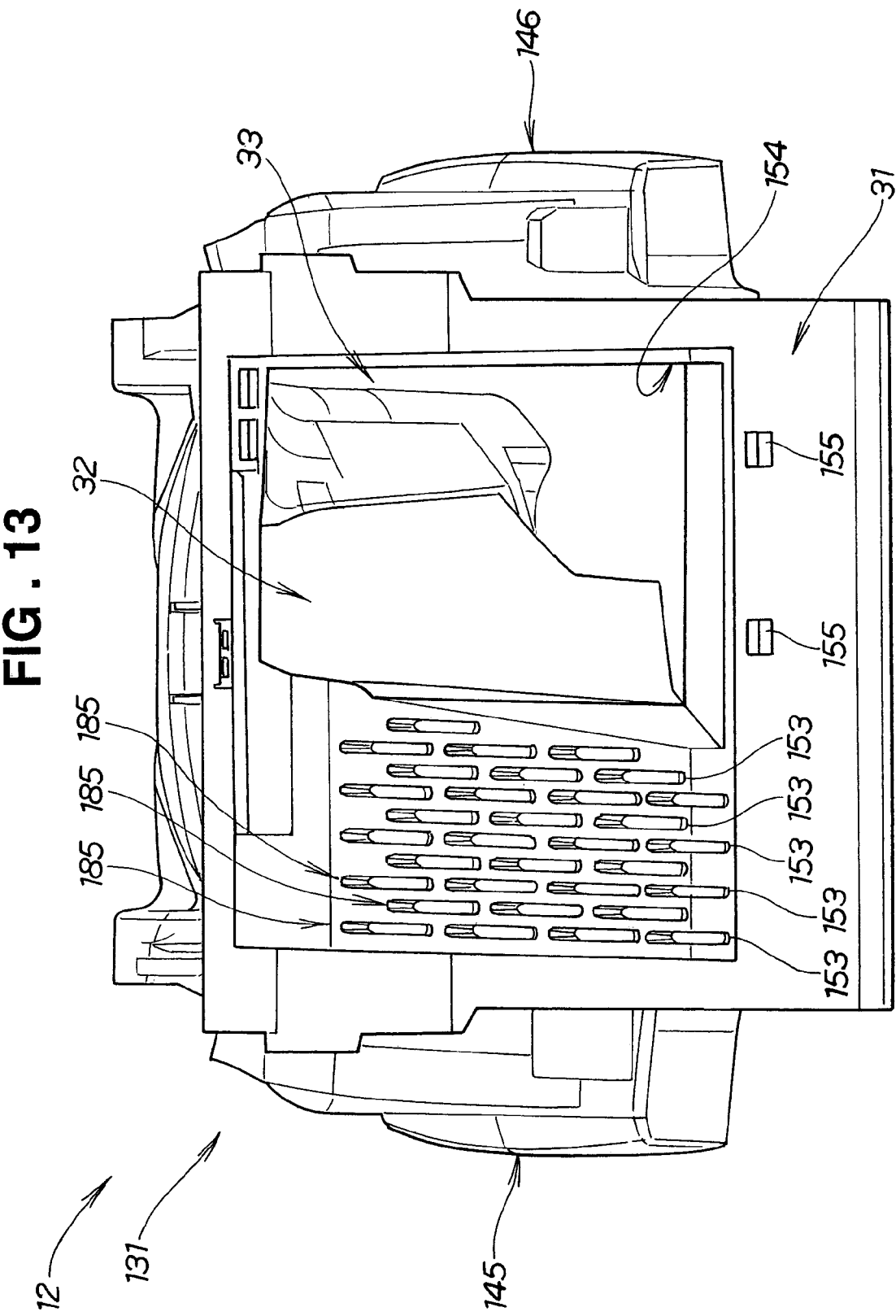
FIG. 13 is a front view of the rear wall shown in FIG. 10.

As shown in FIG. 12, the upper taper part 131 of each of the internal pressure control holes 153 has a sharp slope and performs the role of a deflecting part for deflecting the flow of air downwardly of the cutter housing 12.

That is, by each of the internal pressure control holes 153 having the upper taper part (deflecting part) 181 for deflecting the flow of air at its upper end, cut grass having passed through the internal pressure control holes 153 can be made to fall to the lawn surface. As a result, the accumulation of cut grass on the peripheral parts (for example the axle 35 of the rear wheels 17, 17 and the belt 29 shown in FIG. 4) of the cutter housing 12 (see FIG. 7) can be suppressed.

By multiple internal pressure control holes 153 for lowering the internal pressure of the grass bag 24 being formed in the rear wall 31 next to the exit 154 of the cut grass carrying passage 32 like this, the flow of the carrying draft into the grass bag 24 (see FIG. 2) is ensured. As a result, a large quantity of cut grass can be collected in a grass bag 24 of a fixed size.

Next, accumulation states of cut grass in the grass bag 24 will be discussed, on the basis of FIG. 14A and FIG. 14B.

Figure 14A:
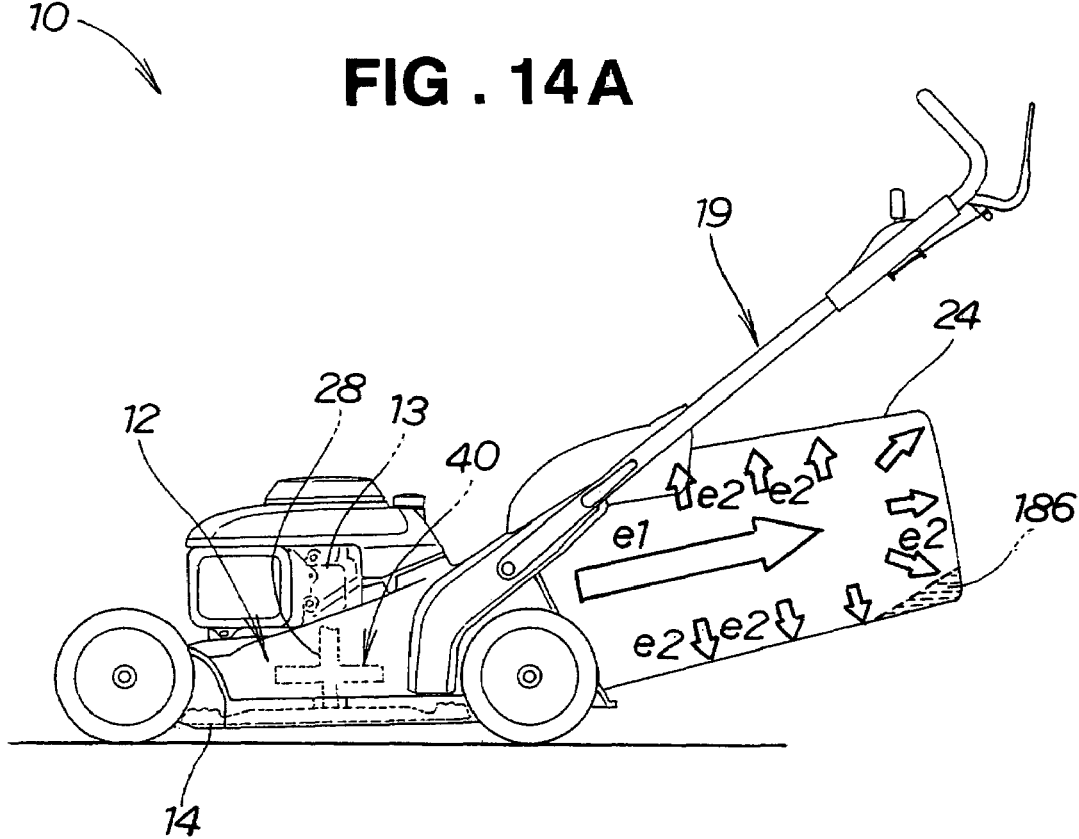
FIG. 14A and FIG. 14B are views showing grass cuttings accumulating in a grass bag.

In FIG. 14A, cut grass 186 is carried through the cut grass carrying passage 32 (see FIG. 3) into the grass bag 24 by the carrying draft as shown by the arrow e1, and the cut grass 186 remains in the grass bag 24 and only the carrying draft is allowed to escape through the porous grass bag 24, as shown by the arrows e2, e2.

Figure 14B:
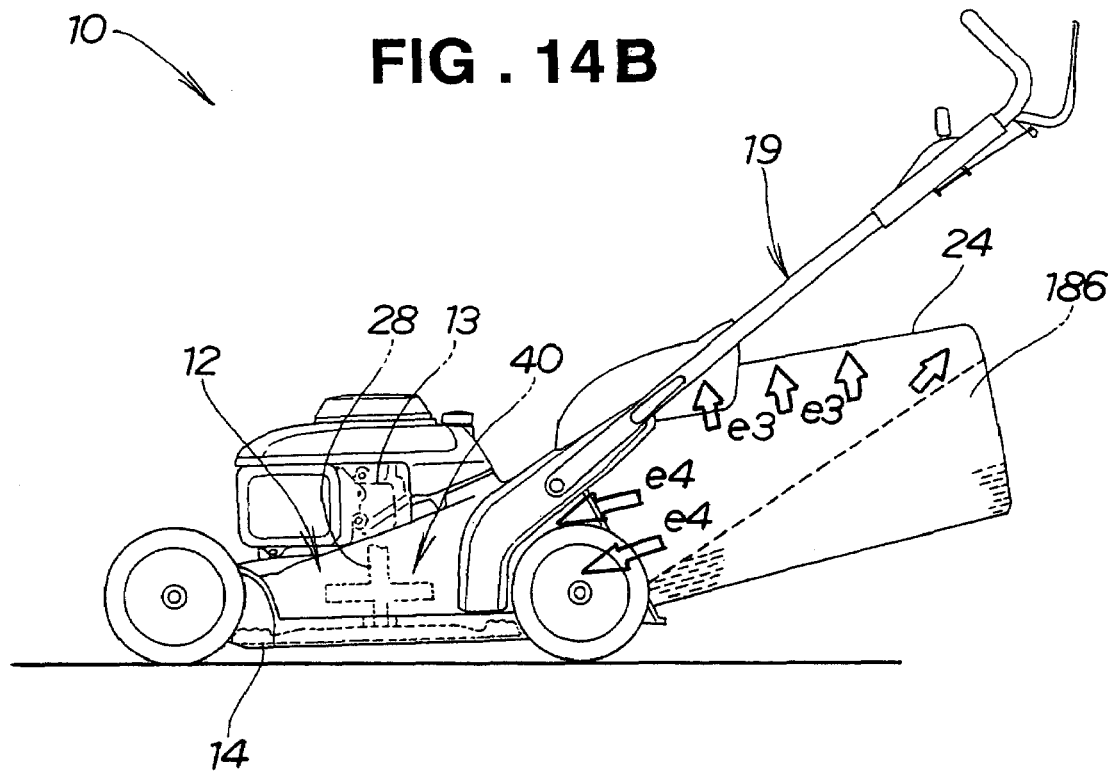
Figure 15:
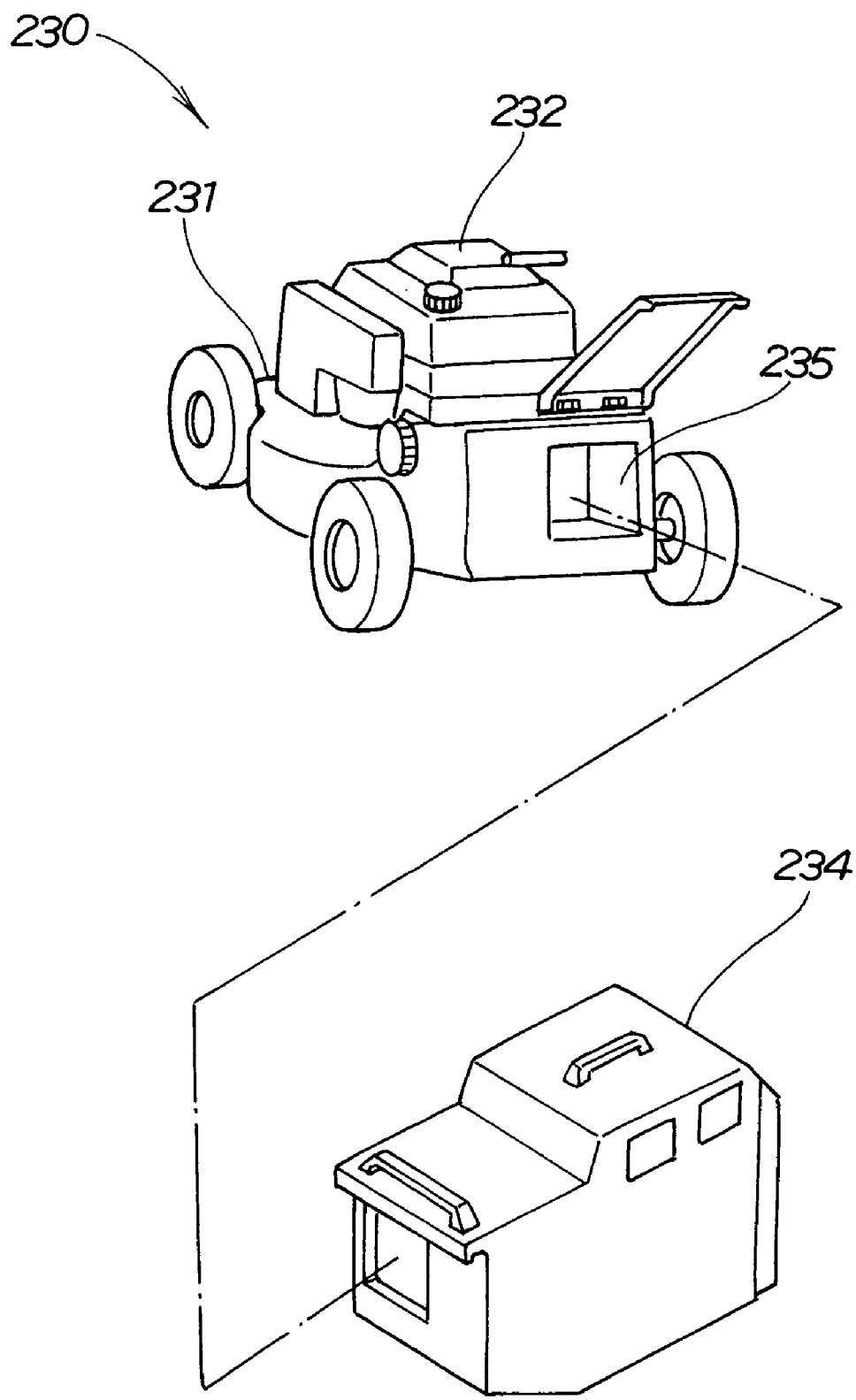
FIG. 15 is a view showing a lawn mower of related art having a grass bag.

In FIG. 14B, the grass bag 24 is made from a porous material having air holes (not shown) that allow only the carrying draft to pass through, without allowing cut grass to pass through. However, grass cuttings have many and various different shapes, and as the amount of cut grass 186 accumulated in the grass bag 24 increases, it becomes difficult for the carrying draft to escape through the porous grass bag 24, the internal pressure of the grass bag 24 increases, and the cut grass collecting capacity of the grass bag 24 falls.

To avoid this, the carrying draft is allowed to escape through multiple internal pressure control holes 153 (see FIG. 11) as shown by the arrows e4,e4, so that increasing of the internal pressure of the grass bag 24 is suppressed. In this manner, air pressure that tends to build up in the grass bag 24 is relieved through the internal pressure control holes 153. As a result, a large quantity of cut grass 186 can be collected in the grass bag 24.

Although in this preferred embodiment an example has been shown wherein the internal pressure control holes 153 are long holes oriented in the up-down direction of the rear wall 31, as shown in FIG. 10, the invention is not limited to this, and alternatively for example they may be made long holes given a predetermined angle (made to slope) in the rear wall 31.

Obviously, various minor changes and modifications of the present invention are possible in the light of the above teaching. It is therefore to be understood that within the scope of the appended claims the invention may be practiced otherwise than as specifically described.

What is claimed is:

1. A lawn mower comprising:
   a cutter housing having a scroll part and having at a rear part thereof a cut grass carrying passage for carrying cut grass from the scroll part; and
   a porous grass bag removably attached to a rear wall of the cutter housing, the rear wall having an exit of the cut grass carrying passage formed therein;
   wherein the rear wall has a plurality of internal pressure control holes extending therethrough proximately to the cut grass carrying passage exit to reduce an internal pressure of the grass bag; and
   wherein the cutter housing comprises a housing main body having an arcuate inner sidewall and a top wall that are connected to the rear wall and jointly define the scroll part and the cut grass carrying passage, the housing main body including the arcuate inner sidewall, the top wall and the rear wall comprising a molded one-piece structure.

2. The lawn mower of claim 1; wherein each of the internal pressure control holes is a long hole oriented in a vertical direction of the rear wall.

3. The lawn mower of claim 1; wherein each of the internal pressure control holes has at an upper part thereof a deflecting part for deflecting a flow of air.

4. A lawn mower comprising:
   a housing main body having an arcuate inner sidewall that terminates at a rear end thereof in a rear wall, and a top wall connected to the inner sidewall and the rear wall to jointly define therewith a housing concavity in which is disposed a cutter blade, the top wall and the inner sidewall forming part of a cut grass passage for conveying cut grass from the housing concavity through an exit opening in the rear wall, and the housing main body including the inner sidewall, the top wall and the rear wall comprising a molded one-piece structure; and
   a porous grass bag removably attached to the cutter housing and having an open end that covers a major part of a rear side of the rear wall so that cut grass conveyed through the exit opening flows into the grass bag; wherein the rear wall has a plurality of holes extending therethrough, the holes being covered by the open end of the grass bag for relieving air pressure that builds up within the grass bag as cut grass accumulates therein.

5. A lawn mower according to claim 4; wherein the exit opening is located on one lateral side of the rear wall and the holes are located only on the other lateral side of the rear wall.

6. A lawn mower according to claim 5; wherein the holes are elongate in the up-down direction of the rear wall.

7. A lawn mower according to claim 5; wherein the holes are arranged in columns that are staggered with respect to adjacent columns.

8. A lawn mower according to claim 4; wherein the holes have at upper parts thereof downward deflecting parts that deflect air flowing from the grass bag through the holes downwardly of the cutter housing.

9. A lawn mower according to claim 8; wherein the upper parts of the holes each have a downward slope that slopes downwardly from the grass bag side of the rear wall to the cut grass passage side thereof and that constitutes the downward deflecting part.

10. A lawn mower according to claim 8; wherein the holes are elongate in the up-down direction of the rear wall.

11. A lawn mower according to claim 8; wherein the holes are arranged in columns that are staggered with respect to adjacent columns.

12. A lawn mower according to claim 8; wherein the exit opening is located on one lateral side of the rear wall and the holes are located only on the other lateral side of the rear wall.

13. A lawn mower according to claim 4; further including a bottom member attached to the housing main body and extending forwardly from the rear wall, below the top wall, and forming part of the cut grass passage.

14. A lawn mower according to claim 13; wherein the cut grass passage is located within the housing concavity.

15. A lawn mower according to claim 4; wherein the cut grass passage terminates at a rear end thereof at the exit opening.

16. A lawn mower according to claim 15; wherein the cut grass passage is located within the housing concavity.

* * * * *